United States Patent
Kwon et al.

(10) Patent No.: US 12,394,862 B2
(45) Date of Patent: Aug. 19, 2025

(54) SEPARATOR FOR SECONDARY BATTERY, METHOD OF MANUFACTURING THE SEPARATOR, AND SECONDARY BATTERY INCLUDING THE SEPARATOR

(71) Applicants: SK INNOVATION CO., LTD., Seoul (KR); SK IE TECHNOLOGY CO., LTD., Seoul (KR)

(72) Inventors: Tae Wook Kwon, Daejeon (KR); Won Sub Kwack, Daejeon (KR); Heung Taek Bae, Daejeon (KR); Chang Hee Lee, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 0 days.

(21) Appl. No.: 18/331,616

(22) Filed: Jun. 8, 2023

(65) Prior Publication Data

US 2023/0402712 A1 Dec. 14, 2023

(30) Foreign Application Priority Data

Jun. 9, 2022 (KR) .......................... 10-2022-0069983

(51) Int. Cl.
  *H01M 50/431* (2021.01)
  *H01M 10/052* (2010.01)
  *H01M 50/403* (2021.01)
  *H01M 50/449* (2021.01)
  *H01M 50/489* (2021.01)

(52) U.S. Cl.
  CPC ....... *H01M 50/431* (2021.01); *H01M 10/052* (2013.01); *H01M 50/403* (2021.01); *H01M 50/449* (2021.01); *H01M 50/489* (2021.01)

(58) Field of Classification Search
  CPC ............. H01M 50/431; H01M 50/403; H01M 50/449; H01M 50/489; H01M 10/052
  See application file for complete search history.

(56) References Cited

U.S. PATENT DOCUMENTS

| | | | | |
|---|---|---|---|---|
| 2013/0252066 A1* | 9/2013 | Yeou | ................... | H01M 50/457 |
| | | | | 429/144 |
| 2014/0329130 A1* | 11/2014 | Kanamura | .......... | H01M 50/414 |
| | | | | 429/144 |
| 2015/0017512 A1 | 1/2015 | Terwonne et al. | | |
| 2016/0149184 A1* | 5/2016 | Nam | ................... | H01M 50/431 |
| | | | | 429/144 |

FOREIGN PATENT DOCUMENTS

| | | | |
|---|---|---|---|
| CN | 111129497 A | * | 5/2020 |
| CN | 113839147 A | * | 12/2021 |
| CN | 113851787 A | * | 12/2021 |
| EP | 4246698 A1 | | 9/2023 |
| JP | 5183435 B2 | | 4/2013 |
| KR | 20060078503 A | | 7/2006 |
| KR | 10-0727248 B1 | | 6/2007 |
| KR | 10-2010-0025568 A | | 3/2010 |
| KR | 10-2010-0028009 A | | 3/2010 |
| KR | 20100092988 A | | 8/2010 |
| KR | 20140011136 A | | 1/2014 |
| KR | 20150084116 A | | 7/2015 |
| KR | 20160073126 A | | 6/2016 |
| KR | 20200144717 A | | 12/2020 |

OTHER PUBLICATIONS

EPO machine generated English translation of CN-113851787-A (Year: 2021).*
EPO machine generated English translation of CN-113839147-A (Year: 2021).*
EPO machine generated English translation of CN-111129497-A (Year: 2020).*
Extended European Search Report for the European Patent Application No. 23178457.0 issued by the European Patent Office on Oct. 18, 2023.

* cited by examiner

*Primary Examiner* — Basia A Ridley
*Assistant Examiner* — Kimberly Wyluda
(74) *Attorney, Agent, or Firm* — IP & T GROUP LLP

(57) ABSTRACT

A separator for a secondary battery, a method of manufacturing the separator, and a secondary battery including the separator, where these separator includes: a porous substrate and an inorganic particle layer formed on at least one surface of the porous substrate, wherein a heat shrinkage rate S of the separator is 8% or less may be provided.

9 Claims, No Drawings

SEPARATOR FOR SECONDARY BATTERY, METHOD OF MANUFACTURING THE SEPARATOR, AND SECONDARY BATTERY INCLUDING THE SEPARATOR

CROSS-REFERENCE TO RELATED APPLICATIONS

This application claims priority under 35 U.S.C. § 119 to Korean Patent Application No. 10-2022-0069983, filed on Jun. 9, 2022, in the Korean Intellectual Property Office, the disclosure of which is incorporated herein by reference in its entirety.

TECHNICAL FIELD

The present disclosure relates to a separator for a secondary battery, a method of manufacturing the separator, and a secondary battery including the separator.

BACKGROUND

It is important for a separator applied to a secondary battery to secure thermal stability in order to prevent a fire by internal short circuit, and to this end, an organic-inorganic composite porous separator in the form in which an inorganic particle layer is stacked on a porous substrate has been developed. The organic-inorganic composite porous separator exhibits thermal stability such as a heat shrinkage rate which has been improved to some extent, but the thermal stability of the products currently on the market is still lacking.

RELATED ART DOCUMENTS

Patent Documents

Patent Document 1: Korean Patent Laid-Open Publication No. 10-2014-0011136 published on Jan. 28, 2014.

SUMMARY

One embodiment of the present disclosure is directed to providing a separator (which has an excellent and improved heat resistance) in a battery having an electrolyte solution inside.

In one general aspect, a separator includes: a porous substrate and an inorganic particle layer formed on at least one surface of the porous substrate, wherein a heat shrinkage rate S of the separator in a battery, represented by the following Equation (1) is 8% or less:

$$S=(A_1-A_2)/A_1*100 \quad (1)$$

wherein
$A_1$ is a length in a width direction of the separator, and
$A_2$ is a length in a width direction of a separator, the separator being obtained by allowing a secondary battery including a negative electrode, a positive electrode, an electrolyte solution, and the separator to stand at 150° C. for 60 minutes, cooling the secondary battery to room temperature, and then disassembling the secondary battery.

In addition, according to another embodiment, S may be 5% or less.

In the following description, two types of specimens with a width of 5 mm and a length of 10 mm were prepared, with one specimen having a length direction in the machine direction and the other specimen having a length direction in a transverse direction. In this embodiment, the separator may have heat resistance so that when the separator is manufactured into two types of specimens each of which has a thickness of 5 to 50 μm, a width of 5 mm, and a length of 10 mm in which a length direction is MD (machine direction) and TD (transverse direction) as noted above, and the specimen is placed in a chamber of thermomechanical analyzer (TMA) by hooking both ends of the specimen to a metal jig and pulled downward with a force of 0.008 N while heating at 5° C. per minute, the two types of specimens are broken at a temperature of 180° C. or higher.

In addition, in another embodiment, the inorganic particle layer may include inorganic particles and a hydrolytic condensate of a silane compound.

In addition, in one embodiment, the hydrolytic condensate of a silane compound may be a hydrolytic condensate which is hydrolyzed and condensation-suppressed in a weakly acidic atmosphere.

In addition, in another embodiment, the silane compound may be a compound represented by the following Chemical Formula 1:

$$A_aSi(OR)_b \quad \text{[Chemical Formula 1]}$$

wherein A is hydrogen, a polar functional group, or a C1-C10 alkyl group having a polar functional group, R is independent of hydrogen or a C1-C5 alkyl group, a is 0 to 2, b is 2 to 4, and a+b is 4.

In addition, in one embodiment, the polar functional group may include any one or two or more selected from an amino group, an epoxy group, a carboxyl group, a hydroxyl group, an amide group, a thiol group, a ketone group, an ester group, and an aldehyde group.

In addition, in another embodiment, the inorganic particles may have an average particle diameter of 0.01 to 1 μm.

In addition, in another embodiment, the porous substrate may include a polar functional group on the surface.

In another general aspect, a method of manufacturing a separator for a secondary battery includes: (a) stirring a silane compound represented by the following Chemical Formula 1, inorganic particles, an acid component, and water to prepare a coating slurry; and (b) applying the coating slurry prepared on at least one surface of a porous substrate and drying the slurry to prepare an inorganic particle layer:

$$A_aSi(OR)_b \quad \text{[Chemical Formula 1]}$$

wherein A is hydrogen, a polar functional group, or a C1-C10 alkyl group having a polar functional group, R is independent of hydrogen or a C1-C5 alkyl group, a is 0 to 2, b is 2 to 4, and a+b is 4.

In addition, in one embodiment, the coating slurry of (a) may be prepared by including the following processes (a1) to (a3):

(a1) preparing an acid aqueous solution including a silane compound represented by Chemical Formula 1 and an acid component;
(a2) stirring inorganic particles, an acid component, and water to prepare an inorganic slurry; and
(a3) stirring the inorganic slurry prepared above and an acid aqueous solution to prepare a coating slurry.

In addition, in one embodiment, the process (a3) may be performed in a weakly acidic atmosphere of more than pH 4 and pH 7 or less.

In addition, in one embodiment, an absolute value of a difference in pH between the inorganic slurry prepared in the process (a2) and the acid aqueous solution prepared in the process (a1) may be 1 or less.

In addition, in another embodiment, the process of preparing a coating slurry (a) may be performed in a weakly acidic atmosphere of more than pH 4 and pH 7 or less.

In addition, in one embodiment, the polar functional group of the silane compound may include any one or two or more selected from an amino group, an epoxy group, a carboxyl group, a hydroxyl group, an amide group, a thiol group, a ketone group, an ester group, and an aldehyde group.

In addition, in another embodiment, the acid component may be carbon dioxide; or an organic acid including any one or two selected from acetic acid and lactic acid.

In addition, in one embodiment, a weight ratio between the silane compound of Chemical Formula 1 in the coating slurry and the inorganic particles in the process (b) may be 0.1 to 30:99.9 to 70.

In addition, the method of manufacturing a separator for a secondary battery according to an embodiment may further include (c) aging the porous substrate having the inorganic particle layer provided thereon, after the process (b).

In addition, in one embodiment, the porous substrate may be prepared by a hydrophilic surface treatment.

In addition, in another embodiment, the hydrophilic surface treatment may be performed by including one or more of a corona discharge treatment and a plasma discharge treatment.

In still another general aspect, a secondary battery includes the separator for a secondary battery according to the embodiment(s) described above.

Other features and aspects will be apparent from the following detailed description, and the claims.

DETAILED DESCRIPTION OF EMBODIMENTS

Hereinafter, the present disclosure will be described in more detail with reference to specific exemplary embodiments. However, the following specific examples are only a reference, and the present disclosure is not limited thereto and may be implemented in various forms.

In addition, unless otherwise defined, all technical terms and scientific terms have their plain and ordinary meanings as those understood by one of those skilled in the art to which the present disclosure pertains. The terms used in the present disclosure describe specific examples, and are not intended to limit the present disclosure.

In addition, the singular form of terms used in the specification and claims appended thereto may also include their plural form also, unless otherwise indicated in the context.

In addition, unless particularly described to the contrary, the term "comprising" includes other elements rather than the exclusion of any other elements.

In the present specification, "D50" refers to a particle diameter of inorganic particles which corresponds to 50% of a volume-based integration fraction. "D80" refers to a particle diameter of inorganic particles which corresponds to 80% of a volume-based integration fraction. "D20" refers to a particle diameter of inorganic particles which corresponds to 20% of a volume-based integration fraction. D50, D80, and D20 may be derived from particle size distribution results obtained by collecting a sample of the inorganic particles to be measured in accordance with the standard of KS A ISO 13320-1 and performing analysis using a Multisizer 4e Coulter counter available from Beckman Coulter Inc.

In the present specification, "room temperature" refers to a temperature of 20±5° C. In various embodiments of the present disclosure, there is provided a separator for a secondary battery having significantly improved thermal stability inside a battery having an electrolyte solution, a method of manufacturing the separator, and a secondary battery including the separator.

In the past, the thermal stability of a separator has been evaluated by cutting a separator manufactured during a manufacturing process of the separator, allowing it to stand at a high temperature for a certain period of time, and evaluating the measured heat shrinkage rate. The present invention recognized that an evaluation method for predicting the thermal stability of separator in a secondary battery may be different from the heat shrinkage behavior of the separator inside a real battery having an electrolyte solution. Indeed, the present inventors found that the thermal stability determined by an evaluation method without an electrolyte is different from the heat shrinkage behavior of the separator inside a real battery having an electrolyte solution.

One reason that a separator shows different heat shrinkage behavior inside a real battery having an electrolyte solution is due to a chemical change affecting a binding force between a binder which connects and fixes inorganic particle layers to each other and connects and fixes together the inorganic particle layer with a porous substrate in an organic-inorganic composite porous separator. These chemical changes may be caused by the electrolyte solution, dissolution of components in the separator, and/or interactions between the components in the separator and electrolyte salts included in the electrolyte solution. While the exact reason is not clear, by using more real life heat shrinkage conditions, the present inventors have been able to develop and provide a separator which, in a real battery, has improved heat resistance and also has excellent heat resistance.

According to one embodiment of the present disclosure, there is provided a separator having a porous inorganic particle layer formed in which a condensation-suppressed hydrolytic condensate of a silane compound connects and fixes inorganic particles to each other as a binder. Pores in the inorganic particles may be provided by applying a coating slurry formed by stirring an acid aqueous solution (having a pre-adjusted pH and an inorganic slurry) on a porous substrate and drying the slurry.

According to another embodiment, there is provided a separator including a porous substrate and an inorganic particle layer formed on at least one surface of the porous substrate, wherein a heat shrinkage rate S of the separator in a battery, represented by the following Equation 1 is 8% or less, and thus, heat resistance in a battery having an electrolyte solution is excellent. In one embodiment, S may be 5% or less, 3% or less, 2% or less, or 1% or less, 0.7% or less, 0.5% or less, and/or 0.3% or less or 0.25% or less.

$$S=(A_1-A_2)/A_1*100 \qquad (1)$$

wherein $A_1$ is a first length in a width direction of the separator, and $A_2$ is a second length in a width direction of a separator, the separator being obtained by allowing a secondary battery including a negative electrode, a positive electrode, an electrolyte solution, and the separator to stand at 150° C. for 60 minutes, cooling the secondary battery to room temperature, and then disassembling the secondary battery.

In one embodiment, there is provided a secondary battery including an electrolyte solution and the separator inside, and according to another embodiment, there is provided a secondary battery manufactured by the following method:

A negative electrode active material layer including artificial graphite, acryl-based latex having Tg of −52° C., and carboxymethyl cellulose at a weight ratio of 95:3:2 is provided on a copper foil having a thickness of 20 μm to manufacture a negative electrode having a total thickness of 150 μm.

A positive electrode active material including LiCoO$_2$, polyvinylidene fluoride, and carbon black at a weight ratio of 94:2.5:3.5 is provided on an aluminum foil having a thickness of 30 μm to manufacture a positive electrode having a total thickness of 150 μm.

An electrode assembly in which a separator is placed between the negative electrode and the positive electrode is stacked in 12 sets, an electrolyte solution, in which 1 M lithium hexafluorophosphate (LiPF$_6$) is dissolved, is injected into a solution including ethylene carbonate (EC), ethyl methyl carbonate (EMC), and dimethyl carbonate (DMC) at a volume ratio of 25:45:20, and sealing is performed to manufacture a pouch type secondary battery. An exterior material made of aluminum is used as an exterior material of the pouch type secondary battery.

One embodiment may provide a separator which has heat resistance so that, when the separator is manufactured into two types of specimens each of which has a thickness of 5 to 50 μm, a width of 5 mm, and a length of 10 mm in which a length direction is MD and TD, and the specimen is placed in a chamber of TMA (thermomechanical analyzer, model: SDTA840 (Mettler Toledo)) by hooking both ends of the specimen to a metal jig and pulled downward with a force of 0.008 N while heating at 5° C. per minute, the specimens are broken at a temperature of 180° C. or higher, 190° C. or higher, 200° C. or higher, or 210° C. or higher, 220° C. or higher or 225° C. or higher, and 230° C. or higher.

Hereinafter, each component of the separator of the present disclosure will be described.

In one embodiment, according to a non-limiting example, a polyolefin-based porous substrate having polyethylene, polypropylene, or a copolymer thereof as a main component may be used as the porous substrate, and the porous substrate may be a film or sheet formed of any one or two or more resins selected from the group consisting thereof.

The thickness of the porous substrate is not particularly limited, but for example, may be 1 μm or more, 3 μm or more, 5 μm or more and 100 μm or less, 50 μm or less, 30 μm or less, 20 μm or less, or between the numerical values. The thickness of the porous substrate may be, as a non-limiting example, 1 to 100 μm, 5 to 50 μm, and/or 5 to 30 μm. The porous substrate may be, according to one example, a porous polymer substrate manufactured by stretching.

In one embodiment, the porous substrate may include a polar functional group on the surface. A non-limiting example of the polar functional group may include one or more of a carboxyl group, an aldehyde group, a hydroxyl group, and the like. The polar functional group may be, in one embodiment, introduced by a hydrophilic surface treatment, and the hydrophilic surface treatment may be, in one embodiment, performed by including one or more of a corona discharge treatment and a plasma discharge treatment. The polar functional group provided on the surface of the porous substrate may be hydrogen bonded or may be chemically bonded to the polar functional group of the hydrolytic condensate binder of a silane compound (described later) to further improve adhesive strength between the porous substrate and the inorganic particle layer, and to further lower a heat shrinkage rate at a high temperature to improve thermal stability.

In one embodiment, the inorganic particle layer may include inorganic particles and a hydrolytic condensate of a silane compound, and the inorganic particle layer may be a porous inorganic particle layer in which the inorganic particles are connected and fixed by the hydrolytic condensate of a silane compound to form pores. In another embodiment, the inorganic particle layer is provided on at least one surface of the porous substrate, and may occupy an area fraction of 60% or more, 70% or more, 80% or more, or 90% or more based on an overall surface of the porous substrate.

In one embodiment, the inorganic particle layer may be coated on one surface, or on both surfaces of the porous substrate, and when both surfaces of the porous substrate are coated with the inorganic particle layer, the thicknesses of the inorganic particle layers coated on one surface and the other surface may be the same as or different from each other. Without particular limitation, in one embodiment, the thickness of the inorganic particle layer coated on one surface may be more than 0 μm, 0.3 μm or more, 0.5 μm or more and 3 μm or less, 2.5 μm or less, 2 μm or less, 1.5 μm or less, 1 μm or less, or any value between these numerical values. In a specific embodiment, the thickness of the inorganic particle layer may be more than 0 μm and 2.5 μm or less, more than 0 μm and 2 μm or less, more than 0 μm and 1.5 μm or less, and more than 0 μm and 1 μm or less.

In one embodiment, the inorganic particles are not limited. As a non-limiting example, the inorganic particles may include one or two or more of metal hydroxides, metal oxides, metal nitrides, and metal carbides, and more specifically, one or two or more of SiO$_2$, SiC, MgO, Y$_2$O$_3$, Al$_2$O$_3$, CeO$_2$, CaO, ZnO, SrTiO$_3$, ZrO$_2$, TiO$_2$, and AlO(OH). In view of battery stability and the like, the inorganic particles may be metal hydroxide particles such as for example boehmite.

Though the metal hydroxide is not particularly limited, a non-limiting example thereof may include one or two or more of boehmite, aluminum hydroxide, and magnesium hydroxide.

In one embodiment, when the boehmite is used, for example, a specific surface area (BET) may be 10 m$^2$/g or more or 15 m$^2$/g or more.

An average particle diameter (D50) of the inorganic particles may be 0.01 μm or more, 0.05 μm or more, 0.1 μm or more and 5 μm or less, 1.5 μm or less, 1 μm or less, 0.5 μm or less, or any value between these numerical values. The average particle diameter (D50) of the inorganic particles may range from, as a non-limiting example, 0.01 to 5 μm, 0.01 to 1 μm or less, and/or 0.01 to 0.5 μm.

As a following embodiment, an example of a binder which connects and fixes the inorganic particles to form an inorganic particle layer having pores formed therein will be described. In one embodiment, the binder may be a low-molecular weight hydrolytic condensate of a silane compound which is obtained by condensing a silane compound represented by the following Chemical Formula 1 and has a very low molecular weight:

$$A_a Si(OR)_b \qquad \text{[Chemical Formula 1]}$$

wherein A is hydrogen, a polar functional group, or a C1-C10 alkyl group having a polar functional group, R is independent of hydrogen or a C1-C5 alkyl group, a is 0 to 2, b is 2 to 4, and a+b is 4. In one embodiment, in terms of bonding strength and the like, a low-molecular weight condensate may be used which is condensed using the silane compound of Chemical Formula 1, wherein b is 3.

The polar functional group of the silane compound may include any one or two or more selected from an amino group, an epoxy group, a carboxyl group, a hydroxyl group, an amide group, a thiol group, a ketone group, an ester group, and an aldehyde group. According to one embodiment of the present disclosure, the polar functional group may be an amino group.

A non-limiting example of the silane compound satisfying Chemical Formula 1 may be any one or a mixture of two or more selected from (3-aminopropyl)triethoxysilane, (3-aminopropyl)trimethoxysilane, and (3-glycidyloxypropyl)trimethoxysilane, but the present disclosure is not particularly limited thereto.

In one embodiment, since the hydrolytic condensate of a silane compound is prepared under the conditions of hydrolyzing a silane compound and also suppressing condensation, it has a low molecular weight. In one embodiment, the hydrolytic condensate of a silane compound may be a hydrolytic condensate which is hydrolyzed and condensation-suppressed in a weakly acidic atmosphere, and may be prepared with a low molecular weight by suppressing a condensation reaction in a weakly acidic atmosphere. In another embodiment, the hydrolytic condensate of a silane compound may have a low molecular weight of a number average molecular weight of, for example, 4000 g/mol or less, 2000 g/mol or less, or 1000 g/mol or less.

Meanwhile, usually, when the silane compound of Chemical Formula 1 is condensed by a strong acid such as for example an inorganic acid, a polysiloxane condensate having a number average molecular weight of more than 4000 g/mol is produced, but the condensation-suppressed hydrolysate of the silane compound of one embodiment of the present disclosure has a hydrolysate of itself, an unreacted material in a monomer form, and a dimer hydrolytic condensate as main components, and is different in that it is a hydrolytic condensate including a trace amount of a trimer hydrolytic condensate or a tetramer hydrolytic condensate.

That is, in one embodiment, the hydrolytic condensate of a silane compound may include any one or two or more selected from hydrolysates, monomers, the hydrolyzed and condensed multimers such as dimers, trimers, tetramers, and pentamers of the silane compound.

The hydrolytic condensate of the low-molecular weight silane compound as the above may be confirmed from a detection peak detected in positive electrospray ionization mass spectrometry (ESI-MS) analysis, using positive electrospray ionization Fourier-transform ion cyclotron resonance Mass Spectrometry analysis (posESI FT-ICRMS) (manufacturer: Bruker, model name: Solarix 2XR). That is, as a result of the positive ESI-MS analysis, a silanol as a hydrolysate and a dimer peak as a condensate are mainly observed, a trace amount of trimer or tetramer peaks are observed, and the peaks of tetramer or higher are hardly detected within 1 or 2 days during which a slurry is usually prepared. However, when hydrolysis-condensation is performed for 24 hours using hydrochloric acid which is an inorganic acid, though not attached separately, high molecular weight peaks are observed in a complicated manner. From the results, it confirms that different forms of materials are obtained with the present disclosure from the hydrolytic condensate of a silane compound prepared in a weakly acidic atmosphere and the hydrolytic condensate prepared with an inorganic acid and the like.

The hydrolytic condensate of a silane compound according to one embodiment is prepared to have a relatively low molecular weight by condensing a silane compound including a polar functional group under the conditions in which a condensation reaction is more suppressed than a hydrolysis reaction, and may secure a higher fraction of the polar group at the same weight than that of a polysiloxane condensate which is usually condensed by an inorganic acid and the like and prepared to have a high molecular weight. Accordingly, the hydrolytic condensate of a silane compound of the present disclosure has an improved adhesive strength for connecting inorganic particles to each other and may impart significant heat resistance.

Next, one embodiment of the method of manufacturing a separator will be described.

Though a way for imparting the physical properties is not limited in the present disclosure, in one embodiment, a method of manufacturing a separator for a secondary battery includes: (a) stirring a silane compound represented by the following Chemical Formula 1, inorganic particles, an acid component, and water to prepare a coating slurry; and (b) applying the coating slurry prepared on at least one surface of a porous substrate and drying the slurry to prepare an inorganic particle layer may be provided:

$$A_a Si(OR)_b$$ [Chemical Formula 1]

wherein A is hydrogen, a polar functional group, or a C1-C10 alkyl group having a polar functional group, R is independent of hydrogen or a C1-C5 alkyl group, a is 0 to 2, b is 2 to 4, and a+b is 4.

The polar functional group of the silane compound may include any one or two or more groups selected from an amino group, an epoxy group, a carboxyl group, a hydroxyl group, an amide group, a thiol group, a ketone group, an ester group, and an aldehyde group.

Hereinafter, each process of the method of manufacturing a separator (according to various embodiments) will be described. Since the description of each of the silane compound, the inorganic particles, and the porous substrate is as described above, it will be omitted for convenience.

As a way for suppressing a condensation reaction as compared with a hydrolysis reaction, according to one embodiment, process (a) may be performed in a weakly acidic atmosphere of having a pH ranging from 4 to 7.

In the process of preparing a coating slurry (a), the method or the order of adding components forming the coating slurry is not particularly limited, but (since inorganic particles such as boehmite are basic) during stirring with water, in one embodiment, a pH range is maintained in a specific range for obtaining a hydrolytic condensate of a silane compound. In one embodiment, the coating slurry of (a) may be prepared by including the following processes (a1) to (a3):

(a1) preparing an acid aqueous solution including a silane compound represented by Chemical Formula 1 and an acid component;

(a2) stirring inorganic particles, an acid component, and water to prepare an inorganic slurry; and (a3) stirring the inorganic slurry prepared above and an acid aqueous solution to prepare a coating slurry.

In one embodiment, an acid aqueous solution including an acid component and the silane compound represented by Chemical Formula 1 is prepared by the process (a1), and an inorganic slurry including an acid component is prepared by the process (a2), respectively, thereby pre-adjusting pH, and thus, the following effect(s) may be expected. Since inorganic particles are basic during stirring with water, when the silane compound, the inorganic particles, and since the acid component are simultaneously stirred, the pH may change while the silane compound is hydrolyzed-condensed in a weakly acidic atmosphere. Due to the change in pH, a hydrolytic condensate of a silane compound having a low molecular weight to be desired may not be secured, and agglomeration between inorganic particles may occur. According to one embodiment, by pre-adjusting the pH of the inorganic slurry and the pH of the acid aqueous solution including the silane compound, a pH change during stirring of the inorganic slurry and the acid aqueous solution in the subsequent process (a3) is reduced or prevented, and the condensation reaction of the silane compound may be suppressed. Thus, a better heat resistance to the separator may be imparted even for a battery having the separator and an electrolyte solution inside.

In one embodiment, an absolute value of a difference in pH between the inorganic slurry prepared in the process (a2) and the acid aqueous solution prepared in the process (a1) may be 1 or less. In view of the above description, in one embodiment, the absolute value of a difference in pH may be 0.7 or less, 0.6 or less, 0.5 or less, 0.4 or less, 0.3 or less, 0.2 or less, or 0.1 or less; and in one embodiment, the absolute value of a difference in pH may be 0.

In one embodiment, the process of preparing an acid aqueous solution (a1) may be performed in a weakly acidic atmosphere having a pH ranging from 4 to 7. When the hydrolysis-condensation reaction is performed at pH 4 or less, in a basic atmosphere (that is more than pH 7), or when using an inorganic acid such as sulfuric acid or hydrochloric acid, the low-molecular weight hydrolytic condensate of a silane compound to be desired may not be obtained, and this may decrease the heat resistance or adhesive strength of a separator. In one embodiment, the weakly acidic atmosphere may be more than pH 4, pH 4.5 or more, pH 7 or less, pH 6.5 or less, pH 6 or less, pH 5.5 or less, pH 5 or less, or any value between these numerical values. In a specific embodiment, the weakly acidic atmosphere may be more than pH 4 and pH 7 or less or pH 4.5 or more and pH 7 or less, and in one embodiment, the weakly acidic atmosphere may be pH 4.5 or more and pH 6.5 or less or pH 4.5 or more and pH 5.5 or less.

In one embodiment, the process of preparing an inorganic slurry (a2) may have the absolute value of a difference in pH of the acid aqueous solution prepared in the process (a1) of 1 or less, but in order to satisfy the hydrolyzed and condensation-suppressed conditions to be desired in the subsequent process of preparing a coating slurry (a3), the following pH conditions may be used for the pH. In one embodiment, the process of preparing an inorganic slurry (a2) may be performed in a weakly acidic atmosphere of more than pH 4 and pH 7 or less. When the pH 4 is pH or less or more than pH 7 during the preparing of an inorganic slurry (a2), the conditions in which the silane compound is hydrolyzed and condensation-suppressed, which is desired in the subsequent process of preparing a coating slurry (a3) may not be met.

In one embodiment, the inorganic slurry (a2) prepared above may have a uniform acidity in order to prevent or reduce a change in pH during stirring with an acid aqueous solution prepared in the process (a1) in the subsequent process of preparing a coating slurry (a3).

In one embodiment, the process of preparing a coating slurry (a3) may be performed in a weakly acidic atmosphere of more than pH 4 and pH 7 or less. When the hydrolysis-condensation reaction is performed at pH 4 or less, in a basic atmosphere (more than pH 7), or when using an inorganic acid such as sulfuric acid or hydrochloric acid, the dispersibility of the prepared coating slurry is poor, and agglomeration between inorganic particles occurs to increase an average particle diameter. Accordingly, the low-molecular weight hydrolytic condensate of a silane compound may not be obtained, and this may decrease heat resistance and/or decrease adhesive strength of the separator. In one embodiment, the weakly acidic atmosphere may be more than pH 4, pH 4.5 or more, pH 7 or less, pH 6.5 or less, pH 6 or less, pH 5.5 or less, pH 5 or less, or any value between theses numerical values. In a specific embodiment, the weakly acidic atmosphere may be more than pH 4 and pH 7 or less or pH 4.5 or more and pH 7 or less, and the weakly acidic atmosphere may be pH 4.5 or more and pH 6.5 or less or pH 4.5 or more and pH 5.5 or less.

In particular, according to another embodiment of the present disclosure, the pH of the acid aqueous solution and the inorganic slurry are pre-adjusted before stirring, and the acid aqueous solution and the inorganic slurry of which the pH has been pre-adjusted are stirred to prepare a coating slurry, thereby preventing pH from rapidly changing and maintaining and controlling the weakly acidic atmosphere so that the condensation reaction is more suppressed than the hydrolysis reaction. Accordingly, in one embodiment, the content of the hydrolytic condensate of a silane compound (which is advantageous for securing excellent heat resistance in a battery having an electrolyte solution) is increased.

In one embodiment, the acid component may be carbon dioxide, or an organic acid including one or two selected from acetic acid and lactic acid. When carbon dioxide is added to the inorganic slurry or the acid aqueous solution and then stirring or bubbling is performed, the carbon dioxide may become carbonic acid. When the acid component is used, the effect of the present disclosure may be achieved in which the condensation reaction is suppressed in the pH range described above, but the present disclosure is not limited thereto.

In one embodiment, a weight ratio between the silane compound of Chemical Formula 1 and the inorganic particles in the coating slurry may be 0.1 to 30:99.9 to 70, but the present disclosure is not particularly limited.

The acid aqueous solution prepared in (a1), the inorganic slurry prepared in (a2), and the coating slurry prepared in (a3) may further include other components.

According to one embodiment of the present disclosure, the inorganic particle layer may be provided on at least one surface of the porous substrate by the process (b). In one embodiment, the present disclosure is not limited to a particular method of applying the coating slurry. The present disclosure is not limited to any particular method of drying the coated slurry for forming the inorganic particle layer, and may be performed at 100° C. or lower, or 30 to 60° C.

In one embodiment, after the process (b), a process of aging the porous substrate having the inorganic particle layer provided thereon may be further included. Specifically, the aging may be performed at 50 to 150° C., 65 to 120° C., the aging time may be 2 hours to 24 hours, 10 to 20 hours, and the aging may be performed for 20 hours. Moreover, the drying may be performed in a temperature range of 70 to 120° C. for 10 to 15 hours. Due to the aging, adhesive strength between the porous substrate and the inorganic particle layer may be increased and high temperature shrinkage properties may be improved.

That is, the method for manufacturing a separator for a secondary battery according to one embodiment of the present disclosure further includes the aging step, thereby providing a method for manufacturing a separator having further improved high temperature shrinkage properties by a stable and strong chemical bond between the porous substrate and the inorganic particle layer and improved thermal stability. In addition, adhesive strength between the porous substrate and the inorganic particle layer may be further improved.

In addition, in another embodiment, a secondary battery including the separator may be provided, and (as a non-limiting example) the secondary battery may include a lithium secondary battery. Since the lithium secondary battery is well known and its configuration is also known, it will not be described in detail in the present disclosure. In one embodiment, the lithium secondary battery may include the separator described above between a positive electrode and a negative electrode. Herein, the positive electrode and the negative electrode may be used without limitation.

In one embodiment, the negative electrode may include a current collector, and a negative electrode active material layer including a negative electrode active material and a binder, which is placed on the current collector.

The current collector of the negative electrode may be, as a non-limiting example, one or more selected from the group consisting of a copper foil, a nickel foil, a stainless steel foil, a titanium foil, a nickel foam, a copper foam, a polymer substrate coated with a conductive metal and a combination thereof.

The negative electrode active material in the negative electrode active material layer may include, as a non-limiting example, one or two of a silicon-based material and a carbon-based material. A non-limiting example of the silicon-based material may include a silicon oxide, silicon, a silicon-containing alloy, and a silicon/carbon composite. A non-limiting example of the carbon-based material may include crystalline carbon, amorphous carbon, or a combination thereof. The crystalline carbon may include, for example, graphite such as amorphous, plate-like, flake-like, spherical, or fibrous natural graphite or artificial graphite. An example of the amorphous carbon may include soft carbon, hard carbon, a mesophase pitch carbide, calcined coke, and the like.

The binder in the negative electrode active material layer may include, as a non-limiting example, polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDP), sulfonated-EPDM, a styrene-butadiene rubber (SBR), a fluororubber, an acryl-based binder, a mixture thereof, or the like. For example, the binder may include one of carboxyl methyl cellulose (CMC), styrene-butadiene rubber (SBR), and a mixture thereof.

In one embodiment, the negative electrode active material layer may further optionally include a conductive material. A non-limiting example of the conductive material may include a carbon-based material such as natural graphite, artificial graphite, carbon black, acetylene black, ketjen black, carbon fiber, single-walled carbon nanotubes (SW-CNT), and multi-walled carbon nanotubes (MW-CNT); a metal-based material such as metal powder or metal fiber of copper, nickel, aluminum, silver, and the like; a conductive polymer such as a polyphenylene derivative; or a mixture thereof.

In one embodiment, the negative electrode active material layer may further optionally include a thickener. A non-limiting example of the thickener may be a mixture of one or more of cellulose-based compounds, specifically, carboxymethyl cellulose, hydroxypropyl methyl cellulose, methyl cellulose, alkali metal salts thereof, and the like. The alkali metal may be Na, K, or Li.

In one embodiment, the positive electrode may include a current collector, and a positive electrode active material layer including a positive electrode active material and a binder, which is placed on the current collector.

The current collector of the positive electrode may be, as a non-limiting example, selected from one or more of the group consisting of an aluminum foil, a nickel foil, a stainless steel foil, a titanium foil, a nickel foam, a polymer substrate coated with a conductive metal and a combination thereof.

The positive electrode active material in the positive electrode active material layer may be, as a non-limiting example, a lithium-transition metal oxide, and the lithium-transition metal oxide may include at least one or more of manganese, cobalt, nickel, and iron. As a non-limiting example, the positive electrode active material may include any one or a mixture of two or more materials selected from the group consisting of $LiCoO_2$, $LiNiO_2$, $LiMn_2O_4$, $LiCoPO_4$, $LiFePO_4$, $LiNiMnCoO2$, and $LiNi_{1-x-y-z}Co_xM^1{}_yM^2{}_zO_2$ (wherein $M^1$ and $M^2$ are independent of each other and one or more materials selected from the group consisting of Al, Ni, Co, Fe, Mn, V, Cr, Ti, W, Ta, Mg, and Mo; and x, y, and z are independent of one another with atomic fractions of oxide composition elements, which satisfy $0 \geq x < 0.5$, $0 \geq y < 0.5$, $0 \geq z < 0.5$, and $x+y+z \geq 1$).

The binder in the positive electrode active material layer may include, as a non-limiting example, one or more organic binders such as vinylidene fluoride-hexafluoropropylene copolymer (PVDF-co-HFP), polyvinylidene fluoride (PVDF), polyacrylonitrile, and polymethyl methacrylate, or water-based binders such as styrene-butadiene rubber (SBR), and may be used with a thickener such as carboxymethyl cellulose (CMC).

In one embodiment, the positive electrode active material layer may further optionally include a conductive material. A non-limiting example of the conductive material may include one or more of a carbon-based material such as natural graphite, artificial graphite, carbon black, acetylene black, ketjen black, carbon fiber, single-walled carbon nanotubes (SW-CNT), and multi-walled carbon nanotubes (MW-CNT); a metal-based material such as metal powder or metal fiber of copper, nickel, aluminum, silver, and the like; a conductive polymer such as a polyphenylene derivative; or a mixture thereof.

In one embodiment, the electrolyte solution may include an organic solvent and a lithium salt.

The organic solvent may be, as a non-limiting example, one or more of a carbonate-based, ester-based, ether-based, ketone-based, alcohol-based, or aprotic solvent alone or in combination of two or more, and when the organic solvent is used in combination of two or more, a mixing ratio may be properly adjusted depending on the battery performance to be desired. However, the organic solvent is not limited to the examples described above. A non-limiting example of the organic solvent may include one or more of ethylene carbonate (EC), ethyl methyl carbonate (EMC), dimethyl carbonate (DMC), and the like.

The lithium salt may include, as a non-limiting example, one or more of $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), $LiCl$, $LiI$, $LiB(C_2O_4)_2$, or a combination thereof. However, the present disclosure is not limited to lithium salt or the lithium salts described above.

Hereinafter, the present disclosure will be described in more detail with reference to the examples and the comparative examples. However, the following examples and comparative examples are only an example for describing the present disclosure in more detail, but do not limit the present disclosure in any way.

First, the measurement of physical properties and the evaluation method of the separator will be described.

Heat Shrinkage Rate S of Separator in Battery, Battery Resistance

In order to evaluate heat shrinkage properties of a separator in a secondary battery including an electrolyte solution inside, a length $A_1$ in a width direction of the separator before being assembled into a secondary battery was measured. Thereafter, a secondary battery was manufactured under the following conditions, the secondary battery was allowed to stand in a hot box which was maintained at an internal temperature of 150° C. for 60 minutes in advance and then allowed to stand at room temperature to cool the battery to room temperature, the secondary battery was disassembled to obtain a separator, and a length $A_2$ in a width direction of the separator was measured. Thereafter, the measured $A_1$ and $A_2$ were substituted into the following equation to determine S:

$$S=(A_1-A_2/A_1)*100.$$

Battery resistance was measured as discharge resistance by a J-pulse method for the secondary battery manufactured under the following conditions:

Manufacture of Secondary Battery:

A negative electrode active material layer including artificial graphite, acryl-based latex having Tg of −52° C., and carboxymethyl cellulose at a weight ratio of 95:3:2 is provided on a copper foil having a thickness of 20 μm to manufacture a negative electrode having a total thickness of 150 μm.

A positive electrode active material including $LiCoO_2$, polyvinylidene fluoride, and carbon black at a weight ratio of 94:2.5:3.5 is provided on an aluminum foil having a thickness of 30 μm to manufacture a positive electrode having a total thickness of 150 μm.

An electrode assembly in which a separator is placed between the negative electrode and the positive electrode is stacked in 12 sets, an electrolyte solution in which 1 M lithium hexafluorophosphate ($LiPF_6$) is dissolved is injected into a solution including ethylene carbonate (EC), ethyl methyl carbonate (EMC), and dimethyl carbonate (DMC) at a volume ratio of 25:45:20, and sealing is performed to manufacture a pouch type secondary battery. An exterior material made of aluminum is used as an exterior material of the pouch type secondary battery.

TMA Melt Fracture Temperature

Two types of specimens of the separator with a width of 5 mm and a length of 10 mm were prepared, with one specimen having a length direction in the machine direction and the other specimen having a length direction in a transverse direction. The specimens each having a thickness of 5 to 50 μm, a width of 5 mm, and a length of 10 mm in each of MD and TD serving as length directions were prepared as noted above, and each specimen is mounted on a chamber of a thermomechanical analyzer (TMA) (model: SDTA840 (Mettler Toledo)) by hooking both ends of each specimen to a metal jig and pulled downward with a force of 0.008 N while heating at 5° C. per minute, the temperature at which the specimen was broken in each of MD and TD was recorded.

EXAMPLES

Example 1

Preparation of Coating Slurry

Boehmite (γ-AlO(OH)) having an average particle diameter (D50) of 350 nm as inorganic particles was dispersed in water, lactic acid was added thereto, and vigorous stirring was performed for 6 hours to prepare an inorganic slurry which was adjusted to pH 4.5 and had a solid content concentration of 42 wt %. 3 g of (3-aminopropyl)trimethoxysilane (APTMS) was added to 97 g of water, lactic acid was added thereto, and stirring was performed for 4 hours to prepare an acid aqueous solution at pH 4.5. The inorganic slurry and the acid aqueous solution prepared above were stirred and the concentration was adjusted to prepare a coating slurry which was adjusted to have a weight ratio between APTMS and boehmite of 10:90 and had a solid content of 25 wt % (based on the content of APTMS and boehmite).

Pretreatment of Porous Substrate

Both surfaces of a polyethylene porous film (porosity: 45%, Gurley permeability: 75 sec/100 cc, tensile strength MD: 2090 kgf/cm$^2$/TD: 1910 kgf/cm$^2$) having a thickness of 9 μm as a porous substrate was corona discharge-treated (power density: 2 W/mm) to introduce a surface polar group, and the corona discharge surface treatment was performed at a speed of 3 to 20 mpm (meter per minute).

Manufacture of Separator

The coating slurry prepared above was applied on both surfaces of the porous substrate and dried to form inorganic particle layers having a thickness of 1.5 μm, respectively. The porous substrate on which the inorganic particle layer was formed was aged at 100° C. for 12 hours to manufacture a separator.

Example 2

A separator was manufactured in the same manner as in Example 1, except that in the preparation of the inorganic slurry, acetic acid was used instead of lactic acid.

Example 3

A separator was manufactured in the same manner as in Example 1, except that the inorganic slurry and the acid aqueous solution were not separately prepared, and instead, boehmite having an average particle diameter (D50) of 305 nm as the inorganic particles and APTMS were added to water all together at a weight ratio of 90:10, lactic acid was added, and stirring was performed for 8 hours at pH 4.5 to 5.5 to prepare a coating slurry.

Comparative Example 1

A separator was manufactured in the same manner as in Example 1, except that in the preparation of the coating slurry, 0.25 g of polyvinyl alcohol (PVA) having a melting temperature of 220° C. and a saponification degree of 99% and 2.75 g of acryl latex (ZEON, BM900B, solid content: 20 wt %) having Tg of −52° C. were mixed in 97 g of distilled water to prepare the acid aqueous solution.

Comparative Example 2

A separator was manufactured in the same manner as in Example 1, except that the inorganic slurry and sulfuric acid instead of lactic acid as the acid component in the preparation of the acid aqueous solution were used to prepare a coating slurry maintained at pH 3.5.

Comparative Example 3

A separator was manufactured in the same manner as in Example 1, except that the acid aqueous solution was not prepared and an inorganic slurry which was adjusted to pH 8.2 without adding a separate acid component and had a solid content concentration of 42 wt % was used as a coating slurry.

TABLE 1

| | Heat shrinkage rate of separator in battery | TMA melt fracture temperature (° C.) | | Battery resistance |
|---|---|---|---|---|
| | S (%) | MD | TD | (mΩ) |
| Example 1 | 0.2 | 274 | 230 | 22.86 |
| Example 2 | 0.1 | 262 | 242 | 22.64 |
| Example 3 | 0.6 | 223 | 212 | 23.27 |
| Comparative Example 1 | 8.3 | 159 | 150 | 27.83 |
| Comparative Example 2 | 11 | 173 | 181 | 26.68 |
| Comparative Example 3 | 10.5 | 167 | 152 | 27.23 |

In the above Table 1, the examples of the present disclosure had a heat shrinkage rate S of the separator in a battery of 8% or less to have excellent heat resistance in a battery having an electrolyte solution inside, and had a TMA melt fracture temperature of 180° C. or higher in both MD and TD to have significantly improved and excellent heat resistance of the separator itself. In addition, the secondary battery manufactured using the separators of the examples had lower battery resistance than that of the secondary battery using the separators of the comparative examples. However, the separators of Comparative Examples 1 to 3 (which were not prepared in accordance with the embodiments of the present disclosure) had poor heat resistance in a battery having an electrolyte solution inside, and also had poor heat resistance or battery resistance of the separator itself.

Meanwhile, in Example 3, as a result of adding the inorganic particles and the silane compound all together to water, the pH changed during hydrolysis-condensation of the silane compound, and the heat resistance and the battery resistance were deteriorated a little as compared with Examples 1 and 2.

In particular, the separators of Examples 1 to 3 had a TMA melt fracture temperature of 180° C. or higher in both MD and TD, and considering that the melting temperature of polyethylene which is used as a separator porous substrate is about 140° C., it was shown that the heat shrinkage rate of the separator itself was also significantly excellent.

In Comparative Example 1 using a general organic polymer-based binder, an inorganic particle layer having a thickness similar to the separators of the examples was formed, but heat resistance in a battery having an electrolyte solution inside was poor as compared with the separators of the examples, and the heat resistance and the battery resistance of the separator itself were poor.

In Comparative Examples 2 and 3, pH was excessively low or high, and thus, a low-molecular weight hydrolytic condensate of a silane compound to be desired was not able to be obtained, and as a result, the heat resistance in a battery having an electrolyte solution inside was poor, and the heat resistance and the battery resistance of the separator itself were also poor.

According to various embodiments, a separator having an inorganic particle layer formed in which a condensation-suppressed hydrolytic condensate of a silane compound connects and fixes inorganic particles to each other as a binder to form pores may be provided by applying a coating slurry formed by stirring an acid aqueous solution having a pre-adjusted pH and an inorganic slurry on a porous substrate and drying the slurry. According to various embodiments, a heat shrinkage rate S of the separator in a battery, represented by the following Equation (1) is 8% or less, and thus, a separator having excellent heat resistance of a battery having an electrolyte solution may be provided. In one embodiment, S may be 5% or less, 3% or less, 2% or less, or 1% or less, 0.7% or less, 0.5% or less, and 0.3% or less or 0.25% or less.

$$S=(A_1-A_2)/A_1*100 \quad (1)$$

wherein $A_1$ is a length in a width direction of the separator, and $A_2$ is a length in a width direction of a separator, the separator being obtained by allowing a secondary battery including a negative electrode, a positive electrode, an electrolyte solution, and the separator to stand at 150° C. for 60 minutes, cooling the secondary battery to room temperature, and then disassembling the secondary battery.

One embodiment of the present disclosure provides a separator which has heat resistance so that when the separator is manufactured into specimens each of which has a thickness of 5 to 50 μm, a width of 5 mm, and a length of 10 mm in which a length direction is MD and TD, and the specimen is placed in a chamber of TMA (thermomechanical analyzer, model: SDTA840 (Mettler Toledo)) by hooking both ends of the specimen to a metal jig and pulled downward with a force of 0.008 N while heating at 5° C. per minute, the specimen is broken at a temperature of 180° C. or higher, 190° C. or higher, 200° C. or higher, or 210° C. or higher, 220° C. or higher or 225° C. or higher, and 230° C. or higher in both MD and TD.

One embodiment of providing the above-noted physical properties includes providing a separator for a secondary battery having an inorganic particle layer provided in which inorganic particles are connected to each other to form pores on at least one surface of the porous substrate such as a polyethylene film, and the separator which uses a hydrolytic condensate of a silane compound prepared in specific conditions where a silanol or alkoxysilane-based compound is hydrolyzed and also condensation is suppressed as a binder and satisfies the conditions of the heat shrinkage rate S range of the separator in the battery of the separator has improved heat resistance of the separator itself and also better heat resistance in a battery having an electrolyte solution inside.

In one embodiment, when the conditions of the heat shrinkage rate S range of the separator in a battery are satisfied, any way for imparting thermal stability in a battery having an electrolyte solution may be followed in incorporating the separator into the battery. However, it may be achieved by manufacturing a separator having an inorganic particle layer in which a slurry (obtained by condensing a silane compound represented by the following Chemical Formula 1 in conditions of hydrolyzing the silane compound but suppressing condensation and mixing it with inorganic particles, as a way of imparting the physical properties) is applied on one or both surfaces of a porous substrate such as polyethylene to connect inorganic particles to each other to form pores, but the present disclosure is not so limited.

In one embodiment, as a way for providing the separator having the physical properties, a separator which satisfies the physical properties, may be manufactured by applying a coating slurry obtained by stirring a pH pre-adjusted acid aqueous solution and an inorganic slurry and maintaining and controlling the slurry so that the silane compound of the following Chemical Formula 1 is stably condensed in conditions in which the silane compound is hydrolyzed but condensation-suppressed on at least one surface of the porous substrate and drying the slurry.

$A_aSi(OR)_b$ [Chemical Formula 1]

wherein A is hydrogen, a polar functional group, or a C1-C10 alkyl group having a polar functional group, R is independent of hydrogen or a C1-C5 alkyl group, a is 0 to 2, b is 2 to 4, and a+b is 4. The polar functional group may include any one or two or more of an amino group, an epoxy group, a carboxyl group, a hydroxyl group, an amide group, a thiol group, a ketone group, an ester group, and an aldehyde group.

In one embodiment, a secondary battery including the separator obtained from the exemplary embodiments may be provided.

In addition, in a one embodiment, when the surface of the porous substrate is modified to have a polar functional group such as a carboxyl group, an aldehyde group, and a hydroxyl group by a surface treatment including one or more of a corona discharge treatment and a plasma discharge treatment, hydrogen bonding or chemical bonding with a functional group on the surface of the porous substrate is allowed by the binder which fixes the surface of the inorganic particle layer, and thus, adhesive strength between the porous substrate and the inorganic particle layer is significantly excellent without using a conventional organic polymer-based binder and heat shrinkage rate at a high temperature is significantly lowered, so that thermal stability may be significantly improved.

In addition, in one embodiment, after the inorganic particle layer is formed, an aging process is performed, thereby increasing adhesive strength between the porous substrate and the inorganic particle layer and improving high temperature shrinkage properties.

Hereinabove, although the present disclosure has been described by specific matters, limited exemplary embodiments, and drawings, they have been provided only for assisting in understanding of the present disclosure, but the present disclosure is not limited to the disclosed embodiments, and various modifications and changes as recognized by those skilled in the art to which the present disclosure pertains are included Therefore, the scope of the present disclosure should not be limited to the above-described embodiments, nor necessarily limited by the following claims, as all modifications equal and/or equivalents fall within the scope of the disclosure.

What is claimed is:

1. A separator for a secondary battery comprising:
a porous substrate, and an inorganic particle layer formed on at least one surface of the porous substrate,
wherein the inorganic particle layer includes inorganic particles and a binder comprising a hydrolytic condensate of a silane compound that connects and fixes the inorganic particles,
wherein the separator has heat resistance so that when the separator is manufactured into specimens each of which has a thickness of 5 to 50 μm, a width of 5 mm, and a length of 10 mm, one of the specimens has a length direction being in a machine direction (MD), another of the specimens has a length direction being in a transverse direction (TD), and each of the specimens is placed in a chamber of a thermomechanical analyzer (TMA) by hooking both ends of the specimen to a metal jig and pulled downward with a force of 0.008 N while heating at 5° C. per minute, the specimens are broken at a temperature of 180° C. or higher in both MD and TD, and
wherein a heat shrinkage rate S of the separator in a battery, represented by the following Equation (1) is 8% or less:

$$S=(A1-A2)/A1*100 \quad (1)$$

wherein
prior to heat exposure, A1 is a first length in a width direction of the separator, and after the following heat exposure, A2 is a second length in the width direction of the separator, in which the separator for measurement of A2 is obtained by forming a secondary battery including a negative electrode, a positive electrode, an electrolyte solution, and the separator and subjecting the separator in the electrolyte solution in the secondary battery to a temperature of 150° C. for 60 minutes, cooling the secondary battery to room temperature, and then disassembling the secondary battery.

2. The separator for a secondary battery of claim 1, wherein S is 5% or less.

3. The separator for a secondary battery of claim 1, wherein the silane compound is a compound represented by the following Chemical Formula 1:

$A_aSi(OR)_b$ [Chemical Formula 1]

wherein A is hydrogen, a polar functional group, or a C1-C10 alkyl group having a polar functional group, R is independent of hydrogen or a C1-C5 alkyl group, a is 0 to 2, b is 2 to 4, and a+b is 4.

4. The separator for a secondary battery of claim 3, wherein the polar functional group includes any one or two or more selected from an amino group, an epoxy group, a carboxyl group, a hydroxyl group, an amide group, a thiol group, a ketone group, an ester group, and an aldehyde group.

5. The separator for a secondary battery of claim 1, wherein the inorganic particles have an average particle diameter of 0.01 to 1 μm.

6. The separator for a secondary battery of claim 1, wherein the porous substrate includes a polar functional group on the surface.

7. A secondary battery comprising the separator of claim 1.

8. The separator for a secondary battery of claim 6, wherein the polar functional group comprises a carboxyl group, an aldehyde group, and/or a hydroxyl group.

9. The separator for a secondary battery of claim 1, wherein the hydrolytic condensate of a silane compound is a hydrolytic condensate which is hydrolyzed and condensation-suppressed in a weakly acidic atmosphere.

* * * * *